United States Patent [19]

Kickuth

[11] 4,331,538

[45] May 25, 1982

[54] METHOD FOR BUILDING UP DEFINED PHOSPHATE DEPOSITS FROM WASTE PHOSPHATES

[76] Inventor: Reinhold W. Kickuth, Gilsbergstrasse 9, 3436 Hess.-Lichtenau, Fed. Rep. of Germany

[21] Appl. No.: 199,739

[22] Filed: Oct. 23, 1980

[30] Foreign Application Priority Data

Nov. 3, 1979 [DE] Fed. Rep. of Germany ....... 2944421

[51] Int. Cl.$^3$ .............................................. C02F 3/32
[52] U.S. Cl. .................................. 210/602; 210/631; 210/906
[58] Field of Search ............................... 71/6, 7, 33, 8; 210/906, 602, 702, 715, 723, 631; 435/262, 168, 946

[56] References Cited

U.S. PATENT DOCUMENTS

| 681,884 | 9/1901 | Monjeau | 210/602 |
| 3,461,067 | 8/1969 | Matsumoto et al. | 210/722 X |
| 3,578,432 | 5/1971 | Stiles | 71/33 X |
| 3,768,200 | 10/1973 | Klock | 210/906 X |
| 3,770,623 | 11/1973 | Seidel | 210/602 |
| 3,983,033 | 9/1976 | Latour | 210/906 X |
| 4,141,822 | 2/1974 | Levin et al. | 210/906 X |
| 4,173,531 | 11/1979 | Matsch et al. | 210/906 X |

FOREIGN PATENT DOCUMENTS

| 2129660 | 12/1972 | Fed. Rep. of Germany | 210/602 |
| 2150480 | 4/1973 | Fed. Rep. of Germany | 210/602 |
| 2210619 | 9/1973 | Fed. Rep. of Germany | 210/602 |
| 2217281 | 10/1974 | France | 71/33 |

OTHER PUBLICATIONS

Nesbit; Phosphorus Removal—The State of the Art; Journal WPCF, May 1969; pp. 701, 703, 704.
C & En, Oct. 27, 1980; Science/Technology Concentrates; "Water Plants Purify Wastewater".
Kickuth, R.; Utilization of Manure by Land Spreading; EEC Commission EUR 5672e, Janssen Services, London, 1977; pp. 335-343.
Geoderma, 16 (1976) 219-234 and 433-442; Elsevier Scientific Pub. Co., Amsterdam-Printed in Netherlands.

*Primary Examiner*—Kenneth M. Schor
*Attorney, Agent, or Firm*—Laney, Dougherty, Hessin & Beavers

[57] ABSTRACT

For simultaneous elimination and fixation of phosphates from phosphate burdened aqueous liquids like sewage water a deposit space is formed by a soil matrix containing iron and/or aluminum. The soil matrix is defined by layers of poor hydraulic conductivity along its sides and at the bottom thereof and Limnophytae species like Phragmites, Typha, Carex, Glyceria, Eleocharis, Juncus, *Iris pseudacorus, Iris versicolor,* Schoenoplectus, Phalaris, Arundo are planted in the soil matrix to form a reactive space penetrated by the root systems of said plants. The phosphate containing liquid is introduced along one side of the deposit space and leaves the same with a phosphate content in the 0.1 mg/l range at flow rates in the range of $10^{-3}$ to $10^{-2}$ per sec. Valuable phosphate deposits useful as arable land not requiring any phosphate fertilizer or useful as recoverable phosphate are obtained in amounts depending on the capacity and time period of phosphate fixation.

24 Claims, 1 Drawing Figure

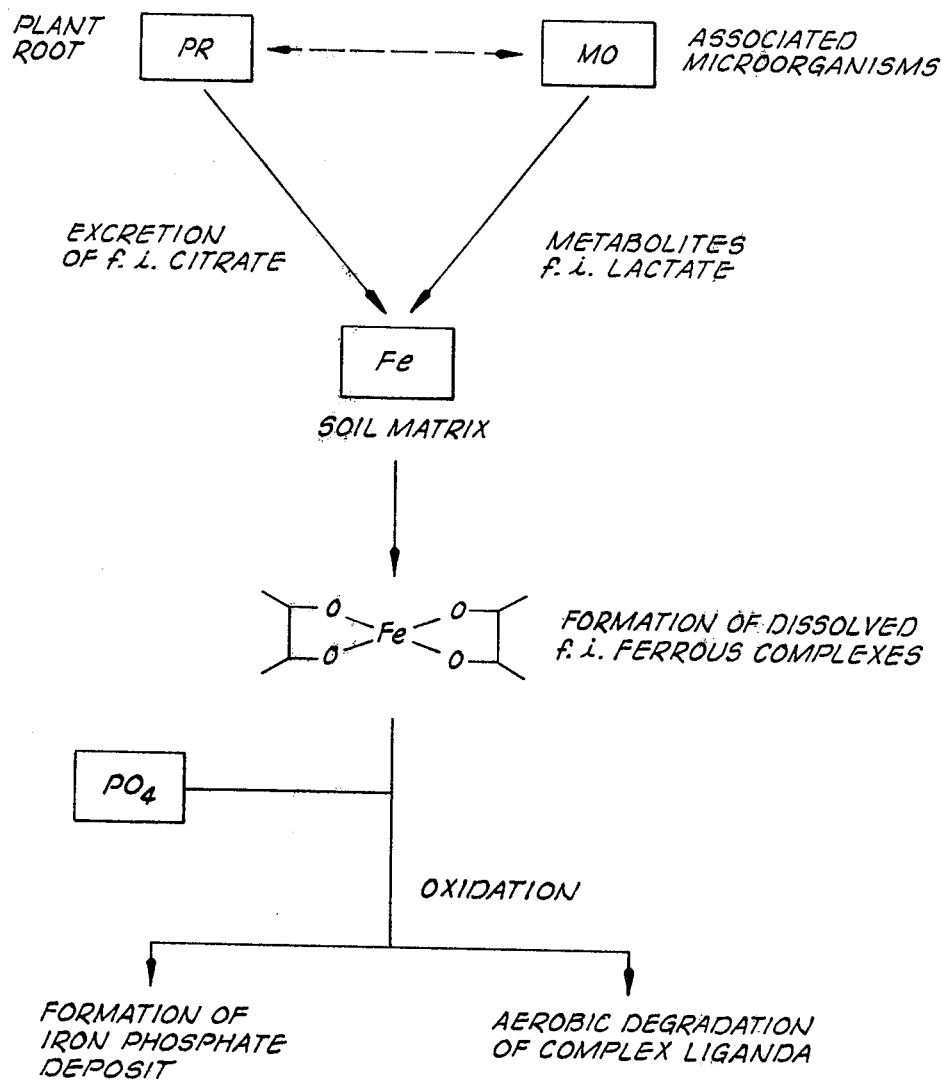

METHOD FOR BUILDING UP DEFINED PHOSPHATE DEPOSITS FROM WASTE PHOSPHATES

BACKGROUND AND SUMMARY OF THE INVENTION

The invention relates to a method for building up a phosphate deposit in which method a phosphate containing aqueous liquid is passed from an input through a reaction space at least laterally defined by a layer having poor hydraulic conductivity and in which method said reaction space is activated by means of the root system formed by plants of Limnophytae species. It is well known that every year large amounts of soluble fertilizer phosphates of inorganic or of organic origin become irreversibly bound to agriculturally used soil and thus become removed from resorption by plants or any other potential utilization. Numerous reactions participate in the overall binding process and are discussed extensively in the professional literature. In agriculturally used soils these processes pertain just to the upper soil layer which is penetrated by the roots of the respective plants and which regularly does not comprise depths of more than 30 to 35 cm of the soil profile.

According to the long term view phosphate fixation in the soil matrix occurs through sorption, ligand exchange with clay minerals, synthesis of organic phosphates by micro-organisms, formation of apatites in the form of precipitated bodies and will result in the build-up of iron phosphates (Vivianite and Strengite) and aluminum phosphate (Variscite) depending on (a) the presence in the soil of reactive iron and aluminum oxides and hydroxides and (b) the realization of their reaction with dissolved ortho-phosphate.

It is known for agriculturally used soils in our latitudes that their average iron and aluminum oxide contents combined with biological and non-biological processes occurring in the soils may yield an annular phosphate fixation of about 75 kg over an area of 1 hectare. This quantity, together with determinants for the hydraulic properties of the soil, represents a significant number for a real sewage clarification by means of "soil treatment" since this number will limit the waste removal capacity of the soil to 100 population equivalents per hectare area.

The aforementioned process cannot result in genesis of economically considerable phosphate deposits as will be evident from the following balance:

| | | |
|---|---|---|
| fixation rate, per annum and per hectare | | 75 kg P |
| reactive space in the soil matrix participating, per hectare | about | 3000 m$^3$ |
| population equivalents, per hectare | about | 100 |
| fixation capacity at an iron content of 5 percent and at pH 7, tons per hectare | about | 55 |
| fixation capacity in terms of time, years | about | 750 |
| index value of phosphate deposited after 100 years, based on the current price of US-$ 1,700 per ton of phosphate | about | US-$ 13,000 |
| index value of phosphate deposited after 750 years at exhaustion of capacity | about | US-$ 100,000 |

In this balance the index value of the phosphate deposit or its richness, respectively, as built up after 100 years is of interest since within about this span of time a crisis condition will develop with respect to the present state of phosphate supply. The richness of phosphate deposit accumulated within this term will not exceed 7.5 tons per hectare.

It is also known that in the rhizosphere sewage treatment method as mentioned initially (see R. Kickuth, "Utilization of Manure by Land spreading" in EEC Commission EUR 5672e, Janssen Services, London, 1977, pages 335 to 343) considerable amounts of phosphate become eliminated. Therein, Limnophytae of the species Phragmites, Juncus, Typha, Schoenoplectus or Eleocharis are planted in the reactive space which by means of a rather voluminous aerenchymatic tissue not only supply the roots as such but also the adherent rhizosphere with oxygen and thus very effectively eliminate organic and nitrogen containing pollutants from the water. The reactive space has a depth of about 60 cm and is passed through horizontally from an input by the water to be purified.

All the methods for treating sewage water, sewage sludge and waste known today do not lead to neogenesis of useful phosphate deposits.

Phosphates are associated with the group of raw materials the supply of which will become exhausted particularly rapidly. While estimates of the supply accessible using presently available means differ considerably, even the most favourable prognoses yield a time span of only 150 years, the most unfavourable ones, however, just 50 years until the known and presumed workable deposits will have become exhausted.

In consideration thereof the annular world-wide introduction of tremendous amounts of phosphates into life supporting and manufacturing processes and, as a consequence thereof, surrendering the same as waste, particularly as sewage components, and additionally as a waste burdening the environment to seawardly directed water flows or deposing the same as sludge or waste in extreme dilution, cannot be advocated anymore.

It is the object of the invention to provide for a method of the initially mentioned kind which is suited for the build-up of a phosphate deposit.

In accordance with the invention this object is achieved by planting the Limnophytae in a reactive space including a soil matrix containing iron and/or aluminum. Thereby it is achieved that the rate and the extent of phosphate fixation in the soil matrix are increased by a big step using correspondingly aimed technical and biotechnical measures so that phosphate supplies are established thereby which may become economically exploited.

Conveniently, the Limnophytae for carrying out the method according to the invention are selected from those species which are adapted to supply oxygen from the air via their aerenchymatic tissue to the root system and, additionally, to the adherent rhizosphere and to thereby form in the binding hydromorphous soil matrix a pattern of aerobic and anaerobic micro compartments. To accelerate the reaction between the phosphate and the iron and/or aluminum compounds those species of Limnophytae are selected for the method according to the invention which by their primary or secondary metabolism give off substances into the reactive space which will bind iron and/or aluminum to form water soluble complexes of high formation constants.

For processing phosphate containing aqueous liquids including organic and inorganic burdens such species will be selected from the Limnophytae which will degrade the burdens by means of organisms associated with the rhizospheres of the Limnophytae.

Particularly suited and active partners in the system are plants of the associated reed-type plants which due to their specific morphological and physiological features determine the turnover of material in the soil matrix to a high degree. In particular the species Phragmites, Typha, Carex, Glyceria, Eleocharis, Juncus, *Iris pseudacorus, Iris versicolor,* Schoenoplectus, Phalaris, Arundo are associated therewith.

In the method according to the invention the reactive space comprises a soil matrix containing fine and coarse clay in the range of 30 to 70 percent by weight based on the total weight of the dry soil matrix and an expandable clay mineral forming a three-layered structure in the range of 10 to 20 percent by weight related to the clay contents. The soil matrix may comprise an iron and/or aluminum rich material which may be selected from the group: spatic iron ore, laterite, terra rossa, bog ore, pea ore, iron ore roast residues, and oolithic and breccious sediments from iron ore mining operations. The iron and/or aluminum rich material also may become dispersed in the phosphate containing aqueous liquid.

Depending on respective conditions of inclination and of hydraulic conductivity the phosphate containing aqueous liquid is introduced into the reactive space along one side thereof either at the surface or below thereof again in dependence on respective local conditions.

In accordance with the invention, therefore, phosphate fixation in the soil matrix is increased by a significant step resulting in economically useful phosphate deposits. The measures employed therefor are directed to 1. affecting soil conductivity in such a way as to render the same receptive to phosphate containing liquids, 2. increasing the depth of the reactive space to about 1.20 m, 3. providing a matrix pattern comprising aerobic and anaerobic micro compartments, and 4. accelerating the chemical reaction of the phosphate present in the liquid with the iron and/or aluminum available from the soil matrix.

DESCRIPTION OF THE DRAWING

A very much simplified diagrammatic representation of the method according to the invention is given in the FIGURE.

DESCRIPTION OF SPECIFIC EMBODIMENT

The plant species as mentioned before (for example *Phragmites vulgaris*) are characterized in that their roots penetrate a given place to a depth of 120 cm and more at full saturation of the soil capillary system with water and so make the same accessible to all those chemical and physical processes connected with the presence or, respectively, activity of living and post-mortal root systems. Such processes are significant for building up a phosphate deposit as intended by the invention and include the following:

1. The hydraulic development of the region penetrated by the roots by continuous physical root activity during growth. This will lead to corresponding states having hydraulic conductivities ranged between $10^{-3}$ and $10^{-2}$ m per sec even from compact substrates having hydraulic conductivities only of $10^{-7}$ m per sec and below within a period of a few years (two to five years). If, on the other hand, the hydraulic conductivity is $10^{-1}$ m per sec in the case of loose material, the hydraulic conductivity will become decreased to values in the range of $10^{-3}$ to $10^{-2}$ m per sec by pore closure and by obstructions due to root activity. Thereby the plant will transform different starting substrates into corresponding states resulting in a uniform and sufficient residence time for the phosphate containing liquid during which the biological and chemical processes of phosphate fixation may proceed to completion. The system of wide pores formed by the root activity and having high hydraulic conductivity will be filled with humous material when the plant roots have died and this material is significant for making the soil matrix hydraulically accessible.

2. The oxygen is carried into the space immediately adjacent to the living root via the aerenchymatic tissue which is unique for reed-type plants. This process which is known as such will render the soil substrate which would be anaerobic otherwisely to be permeated by aerobic micro compartments close to the roots to a depth up to 120 cm. Thereby an alternating distribution of different redox potentials is provided which is not only significant for mobilizing iron oxides and hydroxides as well as for precipitating the iron phosphates formed, but also constitutes a necessary prerequisite for an effective degradation of organic substances and nitrogen compounds accompanying the waste phosphate in the aqueous liquid like sewage water in all cases and in large amounts. It could be shown that in matrices of such kind which hardly can be realized technically in any other way an extremely fast and thorough degradation of even refractory organic compounds is achieved as well as of nitrogeneous compounds with extensive denitrification. Efficiencies per hectare of 100 to 150 tons of organic matter and of 11 to 15 tons of nitrogeneous compounds which are degraded completely or, respectively, eliminated by denitrification could be technically realized per annum.

3. The degradation efficiencies as described sub 2. in connection with the complexing solubilization of iron and aluminum oxides arise from the micro-organisms which are active within the rhizosphere of the plants mentioned and under the redox conditions as mentioned. It will have to be noted in this respect that the so-called rhizosphere effect which is known in principle since 1903 occurs also for reed-like plants in such a way that the population density of micro-organisms living immediately adjacent to the living root is higher by a factor of 10 to 100 and more (as compared to terrestrial plants) resulting in micro-organism densities of $10^9$ to $10^{11}$ living organisms per $cm^3$ of soil in the root region. Thus micro-organism densities are obtained as will be met for instance in the aeration basin in conventional sewage treating plants and as will actually effect degradation of the load matter. The organic acids (lactic acid and others) which are formed within the anaerobic micro compartments are intermediates in methane formation and act to extensively solubilize by complex formation the iron and aluminum oxides present in the matrix and thus make the same accessible to the reaction with the supplied phosphate in homogeneous phase, see R. Kickuth, K. Tubail: Geoderma 16 (1976) pages 219 to 234, 433 to 442.

4. The solubilization processes are significantly intensified by primary plant root excreta containing a great number of Krebs cycle compounds reactive in chelate formation but comprising additionally different metabolites specific for the respective plant species like for instance shikimic acid, quinic acid, phosphorylated inositols, uronic acids, reductones, amino acids and carbohydrates. These compounds together with the different penetration depths of the roots of the various plant species cause a highly differentiated extent of phosphate fixation with respect to time and quantity depending on the respectively used plant species and on the respective soil material.

In a soil matrix prepared and operating in accordance with the invention there will be obtained orthophosphate fixation efficiencies improved by a significant step which may surpass the initially mentioned conventional fixation capacities by a factor of 50 (sometimes by an even higher factor) and the same is also true for other kinds of phosphates contained in the aqueous liquids. A balance established under these conditions will yield the following results:

| | | |
|---|---|---|
| fixation rate, per annum and per hectare | | 3750 kg P |
| reactive space in the soil matrix participating, per hectare | about | 12000 m³ |
| population equivalents, per hectare | about | 5000 |
| fixation capacity at an iron content of 5 percent and at pH 7, tons per hectare | about | 220 |
| fixation capacity in terms of time, years | about | 60 |
| index value of phosphate deposited after 100 years, based on the current price of US-$ 1,700 per ton of phosphate | capacity | exceeded |
| index value of phosphate deposited after 60 years at exhaustion of capacity | about | US-$ 370,000 |

A wide latitude of basic and economic significance is offered by the method described depending on fixation capacity and time of operation of the respective reactive space:

As shown in the balance the phosphate deposit obtained after a comparatively short time of operation like one year will yield a soil with a fixed amount of about 4 tons P. Such a phosphate deposit constitutes valuable arable land after removal of the Limnophytae growth. Considering that the usual cultivated plants have consumption rates in the range of 50 to 80 kg P per annum and per hectare, the phosphate deposit will suffice for more than 50 years agricultural use without requiring any phosphate fertilizer. On the other hand, if used to full capacity, the phosphate deposit will be rich enough and worth of recovering in view of the phosphate sources exploited today. The recovered phosphate deposit may be transformed into a product useful as a fertilizer by processes known per se and used in smelting phosphate containing iron ore.

The method according to the invention, also, may be carried out either after iron-rich substrates have been admixed to the soil or after at least portions thereof have been replaced with material of such kind to a calculated depth. Ad-mixture of material rich in iron and/or aluminum is indicated always, if (a) the contents of active iron and/or aluminum in the soil profile investigated (about 120 cm) is distinctly less than 7 percent so that at an average annual turnover of 3750 kg phosphate per hectare use periods of less than 80 years will result, (b) local phosphate turnover rates exceed 4000 kg annually per hectare due to favourable external conditions.

Calculation may be based on the starting assumption that per each 10 tons of iron supplied (in the form of earth material as mentioned, for an ore or of industrial products) the use period of the deposit forming area will be increased by about one year provided fixation occurs at about neutral pH values.

Enrichment at the place intended for phosphate deposition may be conducted in such a way that after derooting or, respectively, removal of vegetation in the usual manner the selected iron and/or aluminum containing material like for instance a pyrite roast residue containing approximately 50 percent iron is spread by means of an agricultural spreader in an amount corresponding to 10 tons of iron per calculated fixation year and per hectare and is then ploughed under to a depth of 30 cm sub planum by means of an implement operating in a turnover fashion to prepare the soil relief and the planting bed.

In another variation of the method according to the invention the soil matrix is exchanged against a material rich in iron and/or aluminum and all biotechnical measures are taken to realize the method of the invention with such a type of material.

For the exchange all those poorer or richer oxide and carbonate ores of iron and aluminum may be used like for instance spatic ores, laterites, terra rossa-like sediments, bog ore and pea ore as well as oxide roast products of ores and the like.

By such measures the capacity, the operating time and thus the economy of a phosphate deposit may be established arbitrarily within wide limits.

In case the iron containing material is of such a small particle size that it will become entrained by the phosphate containing aqueous liquid to be processed without the risk of sedimentation within the pump and collector system, the material may also be pumped to the deposit forming area via the collecting system in accordance with the iron requirements and will become discharged within the deposit forming area together with the wave of flow; no metering means are required therefor.

In detail, the phosphate fixation is conducted in such a way that in the case of phosphate containing sewage—which it will be regularly—a suitable area for deposit is selected near the phosphate source which area should have an inclination in the range of 0.4 to 5 degrees and a size of 2.30 to 2.50 m² per population equivalent (including a reserve capacity for the smaller fixation rate during the cold season). A hydraulic conductivity of about $10^{-6}$ m per sec should expediently not be exceeded below the level to be developed under the action of the Limnophytae root system so that in the state of full development a conductive root stratum is formed on top of an impervious substratum through which stratum the solution to become de-phosphatized flows horizontally following the direction of descent. Regularly, the phosphate elimination process will end after a flow over a distance of 30 to 90 meters as calculated from the place of immission. After leaving the fixation matrix the water freed from the phosphate load will be supplied to an open or canalized receiving water.

Only in exceptional cases should the phosphate containing liquid pass through the root space vertically in which case the liquid after elimination of the load should be supplied to the body of ground water or to an open receiving water through a drain system.

The upper soil layer providing the root space could be selected to be hydraulically conductive at hydraulic conductivities in the $10^{-2}$ to $10^{-1}$ m per sec range or non-conductive at hydraulic conductivities of $10^{-4}$ m per sec and below. In either case corresponding states having hydraulic conductivities in the $10^{-3}$ to $10^{-2}$ m per sec range will be established within a period of 4 to 5 years due to the activity under load of the roots of the plant species selected in accordance with the invention. In case the selected place has an upper soil starting layer of good conductivity, the reactive space may be placed immediately, i.e. right after planting and full rooting of the plants, under the intended full load, the final elimination activity being obtained after 4 to 5 years only. In case of an upper soil starting layer of low hydraulic conductivity ($10^{-4}$ m per sec and less), the full load may only be applied at the beginning of the fifth year, however, complete elimination will be achieved for the partial loads supplied which should not exceed 25 percent of the full load at the end of the first year of operation. The starting operation of such deposit areas is required to run in accordance with a load plan carefully adapted to the respective conditions.

The operation of the method according to the invention is furthered by a higher density material comprising fine and coarse clay in an amount of about 30 to 70 percent by weight based on the total weight of the dry soil matrix in the reactive space to be penetrated by the roots which clay material must have a content of expandable three-layer structured clay minerals of the montmorillonite type and/or allophanes in the range of 10 to 20 percent by weight related to the entire clay content. The plant species selected in accordance with the respective object to be achieved and with the respective place intended for phosphate deposition is planted during fall, preferably in October, namely 1 to 2 plants of Arundo, 3 to 4 plants of Phragmites, Schoenoplectus, Typha and Glyceria as well as 6 to 10 plants of other types of Limnophytae per square meter. Immission of phosphate loaded water starts in March in accordance with water requirements after the plant growth has been embedded for the winter using tap, rain, river or pool water.

The deposit area is being charged in such a way that in the case of a soil of poor starting hydraulic conductivity the liquid is introduced to the area calculated on the basis of population equivalents including a side ratio factor of 0.5 to 0.3 from the broad side thereof in known manner via a channel having an overflow threshold, via a supply line of any other kind having suitable outlets to comprise the entire width of the immission area, via temporary lines having adjustable outlets in the case of difficult reliefs or via any other suitable immission means adapted to respective conditions, any coarse material having been removed by a grating system prior to immission of the liquid—regularly sewage water—from which the phosphate is to be eliminated. Fine sediments which are usually very rich in phsophate are supplied to the area, too, for increasing the phosphate yields. The fine sediments which are deposited within the closer immission region of the outlets are penetrated upwardly in known way by the roots originating from the nodii of the selected plant species and thus become hydraulically conductive; the sediments will become mineralized to an extent of 75 to 85 percent of the organic carbon contained therein per annum. Phosphate containing sewage water entering the deposit area with a phosphate concentration of 15 to 22 mg per liter, with a $BOD_5$ value of 350 (biological oxygen demand for 5 days) and with a nitrogen content of 90 to 110 mg per liter of total N will leave the active soil matrix with a concentration of 0.04 to 0.18 mg per liter of phosphorus, with a $BOD_5$ value of 7 to 15 and with a concentration of 4 to 14 mg per liter of total N. However, practically all the chloride immitted of about 150 mg per liter will still be present in the run-off water.

By the phosphate elimination as described hereinbefore mineralization of the entrained sediments will raise the relief level by 2 to 4 mm per annum.

Although the organic matter accompanying the phosphate will become degraded mostly anaerobically, practically no undesirable odour due to sewer gas will obtain since release thereof from the anaerobic compartments in the active root space is being prevented by sorption to the solid, mineral soil matrix.

EXAMPLE

Phosphate elimination from a municipal sewage water including removal of fine sediments entrained therein.

| | |
|---|---|
| Drainage area involved | about 25 km$^2$ |
| Number of inhabitants involved | about 2500 |

Average composition of phosphate containing sewage water:

| | |
|---|---|
| Total N | 95 mg/l |
| Total P | 20 mg/l |
| BOD$_5$ | 380 mg/l |
| Used fixation area (60 m . 90 m) | 5400 m$^2$ |

Fe-rich material: oolithic and breccious sediments from

Salzgitter iron ore mining; Fe content about 11 percent.

Starting hydraulic soil conductivity: $3.5 \cdot 10^{-5}$ m per sec.

Immission of sewage water including fine sediments for phosphate elimination after passage through a coarse grating system via an inlet channel having an overflow threshold of 60 m length, from the narrow side.

| | | |
|---|---|---|
| Method of charging: discontinuous pumping | | |
| Average charging volume, per day | | 270 m$^3$ |
| Active Limnophytae plant | | Phragmites communis |
| Root penetration depth | | 110 cm |
| Active reactive space | about | 5940 m$^3$ |
| Fixation rate, per annum | about | 1970 kg P |
| Fixation capacity at the iron content of 11 percent and at pH 7 | about | 653 tons P |
| Fixation capacity in terms of time, years | about | 330 |
| index value of phosphate deposited after 100 years, based on the current price of US-$ 1,700 per ton of phosphate | about | US-$ 340,000 |
| index value of phosphate deposited after 330 years at exhaustion of | | |

-continued

| capacity | about | US-$ 1 mio |
|---|---|---|
| Composition of run-off solution: | | |
| Total N | about | 6 mg/l |
| Total P | about | 0.1 mg/l |
| BOD$_5$ | about | 10 mg/l |

What I claim is:

1. A method for forming a phosphate deposit comprising passing a phosphate containing aqueous liquid through a reaction space comprised of a soil matrix containing a selected one of iron and aluminum and in which are planted reed-like plants having roots which penetrate and activate the soil matrix of the reaction space for deposit of phosphate from the phosphate containing aqueous liquid by creating in said reaction space a hydraulic conductivity in the range of from about $10^{-3}$ to about $10^{-2}$ m per sec, and by supplying oxygen to said soil matrix about said roots to form in said soil matrix a pattern of aerobic and anaerobic micro compartments, and continuing the passing of the liquid for sufficient time such that phosphate is deposited from the liquid onto the soil matrix.

2. The method of claim 1 wherein the phosphate containing liquid is passed through said reaction space in a substantially horizontal direction, and wherein the reaction space is defined at the bottom by a layer having a hydraulic conductivity of $10^{-6}$ m per sec at the maximum.

3. The method of claim 2 wherein the reaction space has a descent extending from where the phosphate containing liquid enters the reaction space and the descent has an angle in the range of from about 0.4 to about 5.0 degrees.

4. The method of claim 1 wherein the reaction space comprises a soil matrix having a total content of fine and coarse clay minerals in the range of from about 30 to about 70 percent by weight based on the weight of the dry soil matrix and having a total content of an expandable clay mineral in the range of from about 10 to about 20 percent by weight based on the total clay content.

5. The method of claim 1 wherein the soil matrix comprises material selected from the group consisting of spatic iron ore, laterite, terra rossa, bog iron ore, pea ore, iron ore roast products, oolithic and breccious sediments from iron ore mining.

6. The method of claim 4, wherein material containing a selected one of iron and aluminum is suspended in the phosphate containing aqueous liquid passing through said reaction space, said material being selected from the group consisting of spatic iron ore, laterite, terra rossa, bog iron ore, pea ore, iron ore roast products, oolithic and breccious sediments from iron ore mining.

7. The method of claim 1 wherein the reed-like plants are selected from those species which by their primary or secondary metabolism give off substances into the reaction space which will bind at least a selected one of iron and aluminum to form water soluble complexes of high formation constants.

8. The method of claim 7 wherein the reaction space has a depth in the range of from about 0.6 m to about 1.20 m.

9. The method of claim 8 wherein the phosphate containing liquid is passed through the reaction space in a substantially horizontal direction, and wherein the reaction space is defined at the bottom by a layer having a hydraulic conductivity of $10^{-6}$ m per sec at the maximum.

10. The method of claim 9 wherein the reaction space has a descent extending from where the phosphate containing liquid enters the reaction space at an angle in the range of from about 0.4 to about 5.0 degrees.

11. The method of claim 8 wherein the reaction space comprises a soil matrix having a total content of fine and coarse clay minerals in the range of from about 30 to about 70 percent by weight based on the weight of the dry soil matrix and having a total content of an expandable clay mineral in the range of from about 10 to about 20 percent by weight based on the total clay content.

12. The method of claim 11 wherein the solid matrix comprises a material selected from the group consisting of spatic iron ore, laterite, terra rossa, bog iron ore, pea ore, iron ore roast products, oolithic and breccious sediments from iron ore mining.

13. The method of claim 11 wherein a material containing a selected one of iron and aluminum is suspended in the phosphate containing aqueous liquid, said material being selected from the group consisting of spatic iron ore, laterite, terra rossa, bog iron ore, pea ore, iron ore roast products, oolithic and breccious sediments from iron ore mining.

14. The method of claim 1 wherein the phosphate containing aqueous liquids include organic and inorganic burdens and wherein the reed-like plants are selected from those species which will degrade the burdens by means of organisms associated with rhizospheres of the reed-like plants.

15. The method of claim 14 wherein the reed-like plants are selected from the genus group consisting of Phragmites, Typha, Carex, Glyceria, Eleocharis, Juncus, Iris, Phalaris, and Arundo.

16. The method of claim 15 wherein the reaction space has a depth in the range of from about 0.6 m to about 1.20 m.

17. The method of claim 16 wherein the phosphate containing liquid is passed through the reaction space in a substantially horizontal direction, and wherein the reaction space is defined at the bottom by a layer having a hydraulic conductivity of $10^{-6}$ m per sec at the maximum.

18. The method of claim 17 wherein the reaction space has a descent extending from where the phosphate containing liquid enters the reaction space and the descent has an angle in the range of from about 0.4 to about 5.0 degrees.

19. The method of claim 16 wherein the reaction space comprises an inlet for receiving the phosphate containing liquid and an outlet disposed opposite from the inlet and connected to a receiving water conduit.

20. The method of claim 16 further comprising the step of filtering the phosphate containing liquid through a grating system prior to passing the phosphate containing liquid through the reaction space.

21. The method of claim 16 wherein the reaction space comprises a soil matrix having a total content of fine and coarse clay minerals in the range of from about 30 to about 70 percent by weight based on the weight of the dry soil matrix and having a total content of an expandable clay mineral in the range of from about 10 to about 20 percent by weight based on the total clay content.

22. The method of claim 21 wherein the soil matrix comprises a material selected from the group consisting of spatic iron ore, laterite, terra rossa, bog iron ore, pea ore, iron ore roast products, oolithic and breccious sediments from iron ore mining.

23. The method of claim 21 wherein a material containing a selected one of iron and aluminum is suspended in the phosphate containing aqueous liquid, said material being selected from the group consisting of spatic iron ore, laterite, terra rossa, bog iron ore, pea ore, iron ore roast products, oolithic and breccious sediments from iron ore mining.

24. A method of removing phosphates from a phosphate containing aqueous liquid comprising passing said phosphate containing aqueous liquid through a soil matrix containing at least a selected one of iron and aluminum and in which are planted reed-like plants having roots which penetrate and activate the soil matrix for deposit of phosphate from the phosphate containing aqueous liquid by creating in said soil matrix a hydraulic conductivity in the range of from about $10^{-3}$ to about $10^{-2}$ m per sec and by supplying oxygen to said roots and said soil matrix about said roots to form a pattern of aerobic and anaerobic micro compartments and continuing the passing of the liquid for sufficient time such that phosphate is deposited from the liquid into the soil matrix.

* * * * *